(12) United States Patent
Schot

(10) Patent No.: US 8,808,069 B2
(45) Date of Patent: Aug. 19, 2014

(54) METHOD FOR PROCESSING A PART OF A SLAUGHTERED ANIMAL AND DEVICE FOR APPLYING SUCH METHOD

(75) Inventor: Adrianus Johannes Gerardus Schot, Dordrecht (NL)

(73) Assignee: FPM International N.V., Kalmthout (BE)

(*) Notice: Subject to any disclaimer, the term of this patent is extended or adjusted under 35 U.S.C. 154(b) by 40 days.

(21) Appl. No.: 13/635,120

(22) PCT Filed: Mar. 16, 2010

(86) PCT No.: PCT/BE2010/000020
§ 371 (c)(1),
(2), (4) Date: Sep. 14, 2012

(87) PCT Pub. No.: WO2011/113116
PCT Pub. Date: Sep. 22, 2011

(65) Prior Publication Data
US 2013/0012113 A1 Jan. 10, 2013

(51) Int. Cl.
*A22C 17/00* (2006.01)
(52) U.S. Cl.
USPC .......................................................... 452/136
(58) Field of Classification Search
USPC ................................................. 452/135–138
See application file for complete search history.

(56) References Cited

U.S. PATENT DOCUMENTS

| | | | |
|---|---|---|---|
| 3,531,825 A * | 10/1970 | Lindgren et al. | 452/149 |
| 3,644,963 A | 2/1972 | Terranova | |
| 4,488,332 A * | 12/1984 | Atteck et al. | 452/136 |
| 4,811,457 A | 3/1989 | Lindert | |
| 5,810,653 A * | 9/1998 | Van Craaikamp et al. | 452/136 |
| 5,813,908 A * | 9/1998 | Craaikamp | 452/136 |
| 2009/0298404 A1 | 12/2009 | Van Der Stouw | |

FOREIGN PATENT DOCUMENTS

| | | |
|---|---|---|
| EP | 0049091 | 4/1982 |
| EP | 0948895 | 10/1999 |

* cited by examiner

*Primary Examiner* — Richard Price, Jr.
(74) *Attorney, Agent, or Firm* — James Creighton Wray

(57) ABSTRACT

Method for processing a part of a slaughtered animal which comprises a meat part connected to a bone and cartilage, comprising the steps of encapsulating an axial end of the bone together with the cartilage into an encapsulating means provided at a bone pusher; activating the encapsulating means into a radially open position for receiving said axial end and bringing the encapsulating means into a radially closed position for encapsulating said axial end; separating the meat part from the bone and cartilage; and releasing the axial end of the bone and cartilage from the encapsulating means.

10 Claims, 5 Drawing Sheets

METHOD FOR PROCESSING A PART OF A SLAUGHTERED ANIMAL AND DEVICE FOR APPLYING SUCH METHOD

This application claims the benefit of PCT/BE2010/000020 filed Mar. 16, 2010, International Publication Number WO 2011/113116, and the amended sheets from the International Preliminary Report on Patentability, which are hereby incorporated by reference in their entirety as if fully set forth herein.

The present invention relates to a method for processing a part of a slaughtered animal.

Typically, the present invention relates to a method for processing fowl thighs such as poultry thighs or turkey thighs, but thighs of pork for example, as well as other parts of a slaughtered animal or parts of another kind of slaughtered animal, are not excluded from being processed by a method in accordance with the invention.

The method is intended for processing parts of a slaughtered animal comprising at least a meat part connected to a bone and cartilage, the meat part being separated from the bone and cartilage during the processing.

Usually, the parts are cut from the slaughtered animal in such a way that at one axial end of the bone there is no or only a small amount of cartilage, while at the other axial end of the bone a considerable amount is present.

According to the state of the art some mechanized methods for removing a bone from a part of a slaughtered animal part already exist.

The problem however with these known methods is that after the removal of the bone the meat part is still contaminated with cartilage, which is not removed with the bone.

As a consequence, in the known methods after the mechanized step of separating the bone from the part of the slaughtered animal, an additional step is required during which the cartilage has to be separated from the meat part in order to obtain a pure meat part, not contaminated with cartilage.

This additional step is inevitably executed manually by cutting the cartilage with a knife from the meat part, which is a very time consuming task and which is therefore also very expensive.

What's more, during such a manual separation often not all cartilage is removed from the meat part due to human errors, and so the meat part remains still somewhat contaminated with cartilage.

Furthermore, when manually cutting the cartilage from the meat part also fragments of pure meat are often cut away and are thrown away with the cartilage.

As a conclusion, with the known methods the separation of the meat part from a bone and cartilage of a part of a slaughtered animal is not optimal and as a result also the benefits that can be obtained are also relatively limited.

The present invention aims at a method for processing parts of a slaughtered animal which do not show one or more of the above and possibly other disadvantages.

To this aim, the invention relates to a method for processing a part of a slaughtered animal which comprises at least a meat part connected to a bone and cartilage, the meat part being separated from the bone and cartilage during the processing, which method comprises at least the steps of:

encapsulating a first axial end of the bone together with the cartilage at that axial end into an encapsulating means prior to the actual separation of the meat from the bone and cartilage;

separating the meat part from the bone and said cartilage while holding said first axial end of the bone and the concerned cartilage encapsulated in the encapsulating means; and, releasing the first axial end of the bone and the concerned cartilage from the encapsulating means.

An important advantage of such a method according to the invention over the known methods is that the cartilage and bone are effectively removed from the meat part of the part of the slaughtered animal in a mechanized way, so that the remaining meat part is not contaminated with cartilage.

The reason is that by encapsulating the first axial end of the bone and the cartilage at that axial end in encapsulating means, the concerned cartilage is held together with the bone during the separation of the meat part and can therefore not remain stuck anymore to the meat part.

The bone and cartilage are only released after the meat part has been removed from the bone and cartilage, so that a clear separation of garbage and pure meat is obtained.

What's more, the method according to the invention is suitable for being executed in a completely mechanized way, so that no additional, manual step is needed anymore.

This is a significant improvement in respect of the known methods, since the processing time is highly reduced and no additional costs are generated anymore for manually removing cartilage from the meat part.

The encapsulating means can for example be formed by a gripper or the like, which gripper has for example parts which are movable between a radial expanded position and a radial retracted position, in which parts of the gripper said first axial end of the bone together with the cartilage at that axial end can be kept encapsulated during the separation.

The present invention also relates to a device for separating a meat part from a bone and cartilage of a part of a slaughtered animal which device can be used for applying a method in accordance with the invention as above described, and in particular for applying such a method in a completely mechanized way.

To this aim, the invention relates to a device for separating a meat part from a bone and cartilage, which device comprises an encapsulating means for encapsulating a first axial end of the bone and the cartilage at that axial end.

It is clear that such a device having encapsulating means is suitable for fully mechanizing the method of the invention, since an axial end of the bone together with the cartilage at that axial end can be encapsulated in the encapsulating means during separation of the meat part in order to avoid contamination of the pure meat with cartilage.

BRIEF DESCRIPTION OF THE DRAWINGS

With the intention of better showing the characteristics of the invention, hereafter, as an example without any restrictive character whatsoever, a preferred form of embodiment of a device in accordance with the invention for separating a meat part from a bone and cartilage according to a method in accordance with the present invention, is described, with reference to the accompanying drawings, wherein:

FIGS. 2 to 5 represent cross sectional views according to a vertical plane through the device of FIG. 1 indicated by line II-II in FIG. 1, respectively for different positions of its movable parts during the separation of a meat part from a bone and cartilage.

DETAILED DESCRIPTION

Figure 1:
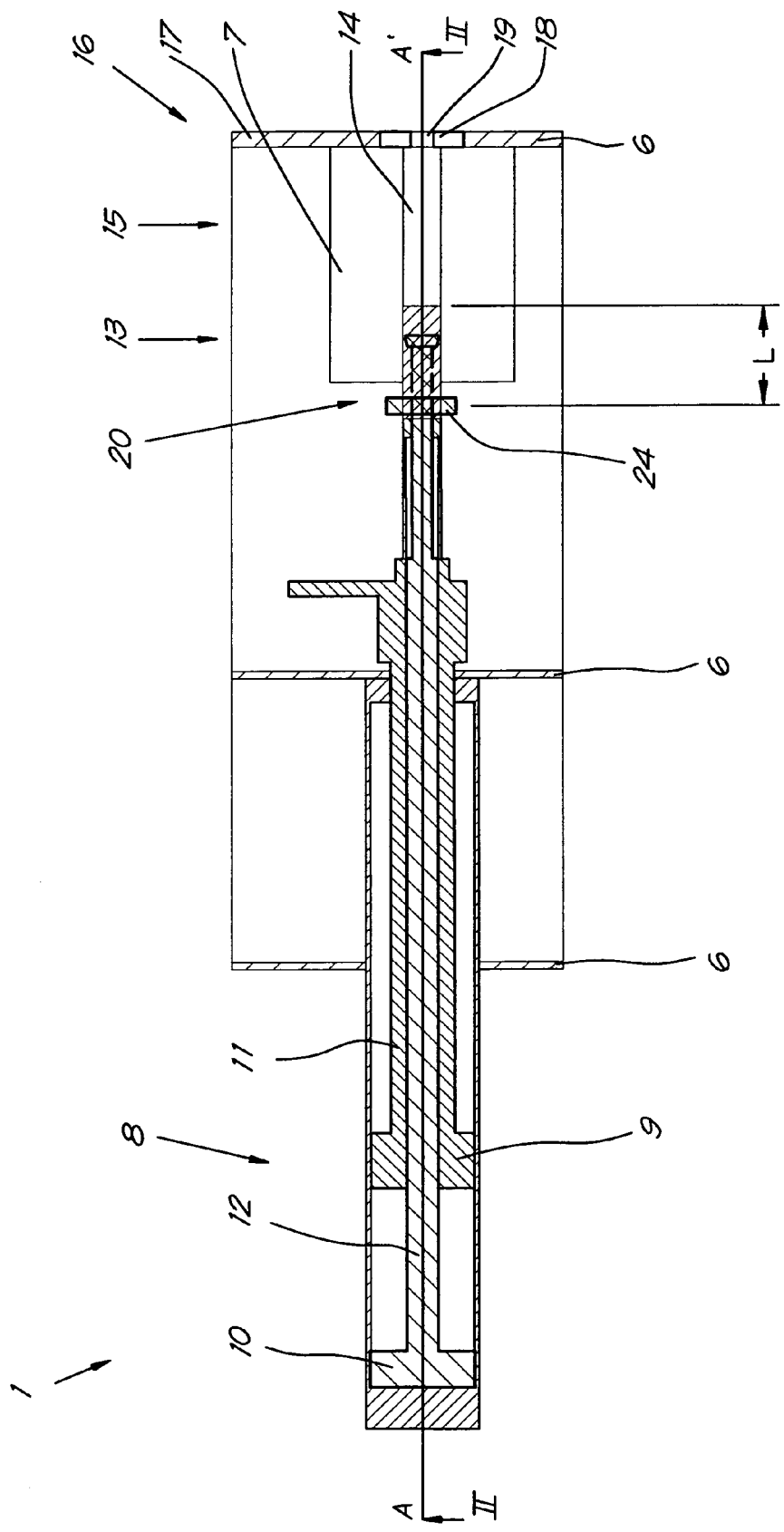
FIG. 1 represents a plan view on parts of a device according to the invention.
Figure 9:
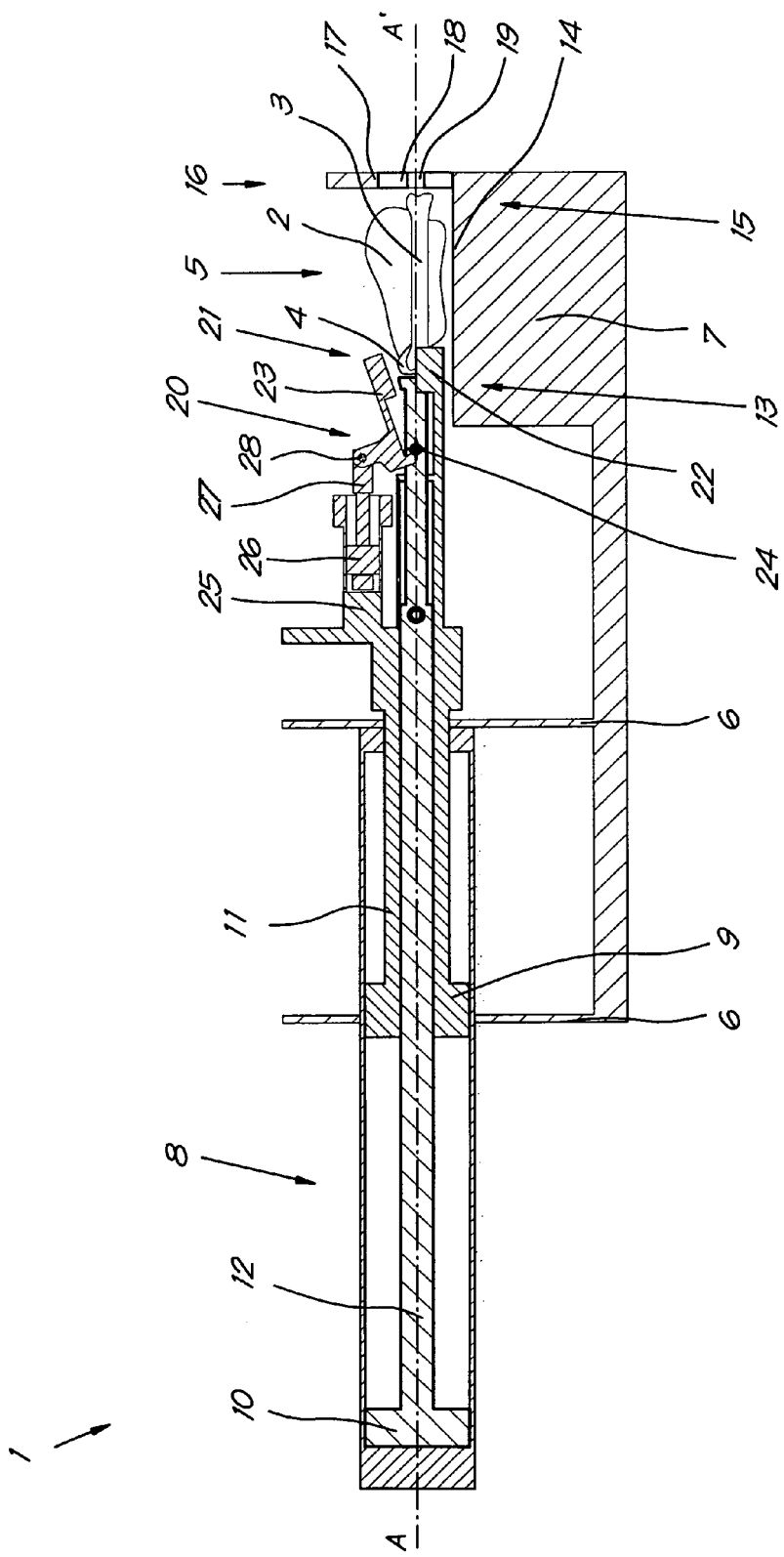

The device 1, represented in FIGS. 1 to 5, is intended for separating a meat part 2 from a bone 3 and cartilage 4 of a part 5 of a slaughtered animal according to a method in accordance with the invention.

Typically, the device 1 will be used for removing a bone 3 and cartilage 4 from a fowl thigh, such as a poultry thigh, turkey thigh or the like.

In the embodiment represented in the figures, the device 1 is provided with a supporting structure 6 which comprises on the one hand a holding means 7 forming a kind of small horizontal platform for receiving a part 5 of a slaughtered animal and on the other hand a horizontal cylindrical tube 8 in which a pair of pistons 9 and 10 is slidably mounted, each provided at an axial end of their respective piston rods 11 and 12.

The piston rods 11 and 12 are executed as a telescopic mechanism, the piston rod 11 being an outer piston rod 11 which is slidable in the axial direction AA' over the inner piston rod 12.

The pair of piston rods 11 and 12 serves as a bone pusher and is therefore provided at a first transversal side edge 13 of the holding means 7 in such a way that the piston rods 11 and 12 are axially aligned with an axial groove 14 in the holding means 7.

Preferably, the axial end of the inner piston 12 which is directed to the holding means 7 is executed with a head which is suitable for receiving and pushing an axial end of a bone 3, for example by having a hollow conical shape or the like with dimensions corresponding to the bone 3 to be pushed.

At an opposite transversal side edge 15 of the holding means 7, the supporting structure 6 is provided with a meat stripper 16.

In the example shown, this meat stripper 16 consists of a vertical base plate 17 with a central circular hole in which an elastic membrane 18 is provided, for example made of an elastic synthetic rubber or the like.

In the elastic membrane 18 an aperture 19 is provided which is centered on the axial prolongation of the central axis AA' of the bone pusher formed by the piston rods 11 and 12.

Characteristic for the invention is the fact that encapsulating means 20 are mounted on the axial end 21 of the bone pusher which is directed to the holding means 7, in particular on the axial end 21 of the outer piston rod 11.

Said encapsulating means 20 are intended for encapsulating a first axial end of the bone 3 and cartilage 4 at that axial end as will be explained further.

In the represented embodiment said encapsulating means 20 consist of a pair of half cylindrical walls 22 and 23 which are movable with respect to one another.

The first half cylindrical wall 22 is formed by the axial end 21 of the outer piston rod 11 itself.

The second half cylindrical wall 23 is mounted rotatably with one of its axial ends to the outer piston rod 11 by means of a hinge 24, which hinge 24 is positioned at a certain offset distance L from the axial end 21 of the outer piston rod 11 corresponding to the length L of the second half cylindrical wall 23.

In this way the second half cylindrical wall 23 is actually forming a finger 23 which is at least partly movable between a radial outward position and a radial inward position with respect to the axis AA' of the bone pusher.

For actuating the rotation of the half cylindrical wall or finger 23 of the encapsulating means 20 around the hinge 24 a small cylindrical tube 25 is mounted parallel to the outer piston rod 11 near the axial end 21 of the outer piston rod 11 which cylindrical tube 25 is aligned also along the axial direction AA'.

In said cylindrical tube 25 a piston 26 is provided at a first axial end of a piston rod 27, the piston 26 and piston rod 27 being slidable along the axial direction in the cylindrical tube 25.

The other axial end of the piston rod 27 is connected to a hinge 28 mounted on the half cylindrical wall or finger 23 of the encapsulating means 20 at a certain distance from the hinge 24.

In this manner, the finger 23 is provided with actuating means which allow for a movement of the finger 23 between a radial outward position and a radial inward position with respect to the first half cylindrical wall 22 and for holding the finger 23 in the respective positions.

The device 1 is also provided with actuating means (not represented in the figures) for bidirectional axial movement of the pistons 9, 10 and 25 with their respective piston rods 11, 12 and 27 in the concerned cylindrical tubes 6 and 25.

In accordance with the standard techniques used for this purpose, such actuating means preferably consist in pressurized air lines mounted on the respective axial ends of the cylindrical tubes 6 and 25, the lines being provided with automatically activated valves for controlling the air pressure in the cylindrical tubes 6 and 25, in particular at both sides of the respective pistons 9, 10 and 25 for their axial movement in the cylindrical tubes 6 and 25.

Figure 5:
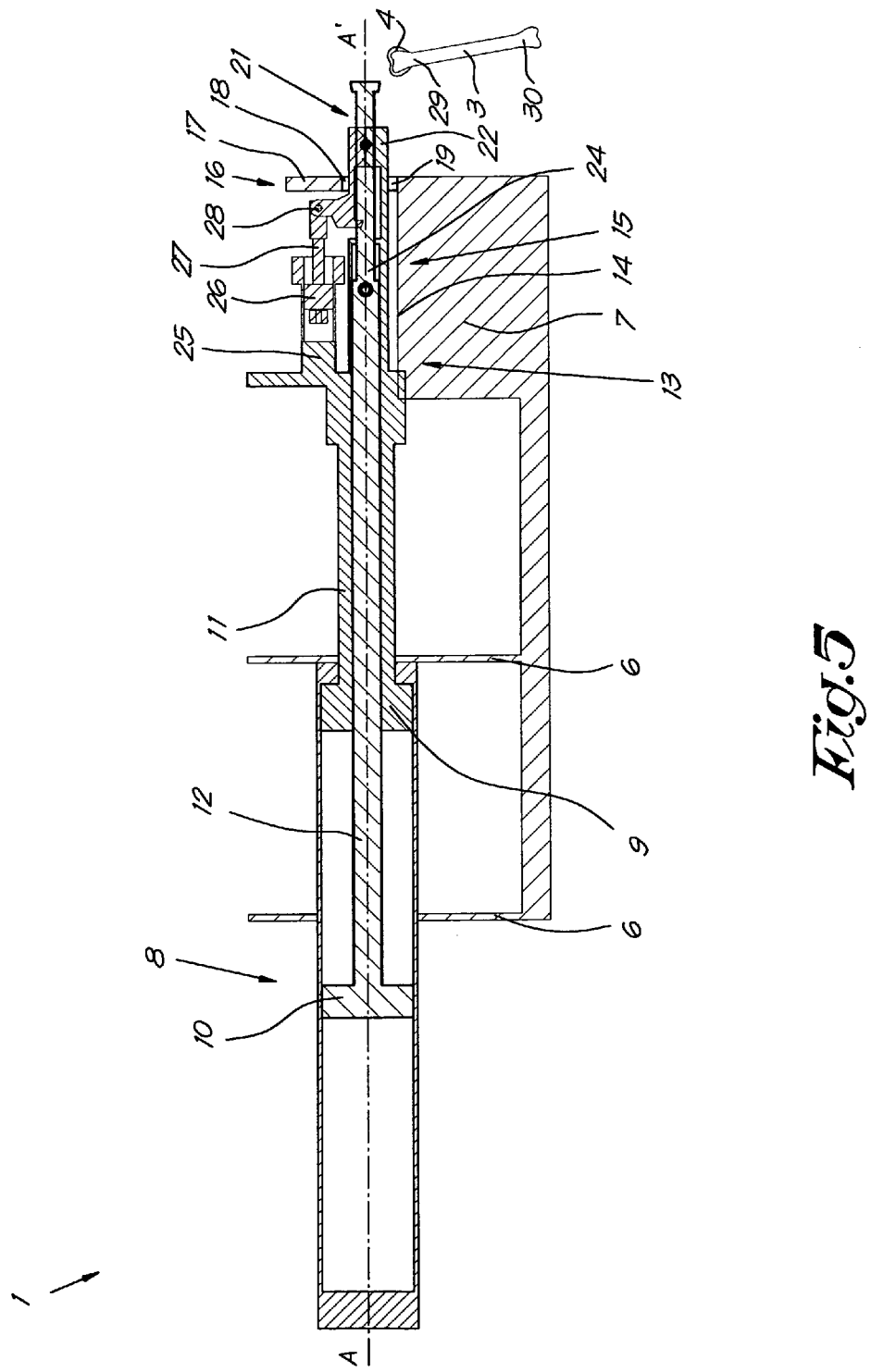

In this way the bone pusher formed by the piston rods 11 and 12 is provided with actuating means for a movement of the bone pusher in the axial direction AA' between, on the one hand, an axial backward position for receiving parts 5 of a slaughtered animal between the bone pusher and the meat stripper 16, which backward position is represented in FIG. 2, and, on the other hand, a forward position in which the encapsulating means 20 are pushed through the meat stripper 16, which position is represented in FIG. 5.

Figure 3:
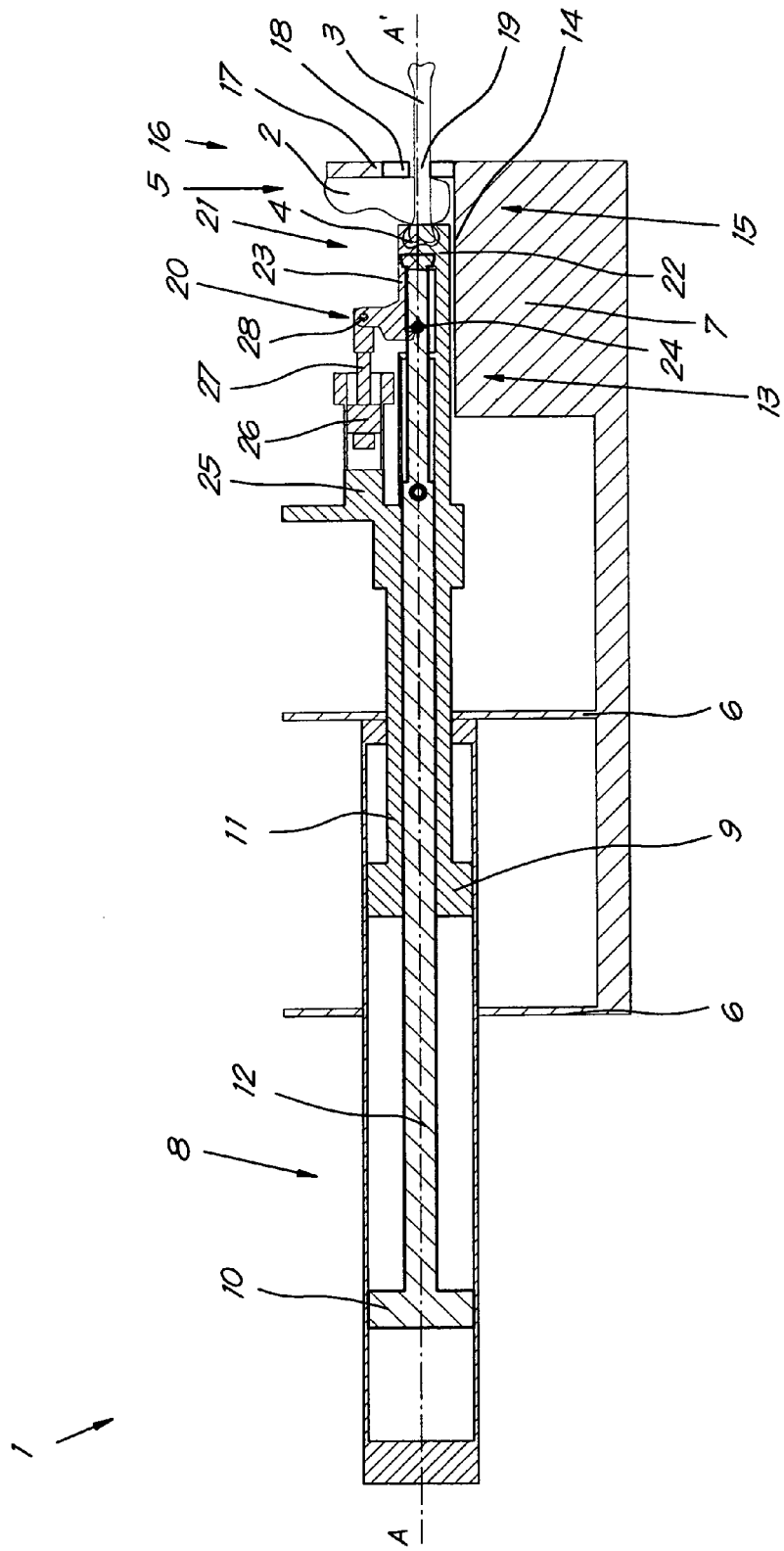
Figure 4:
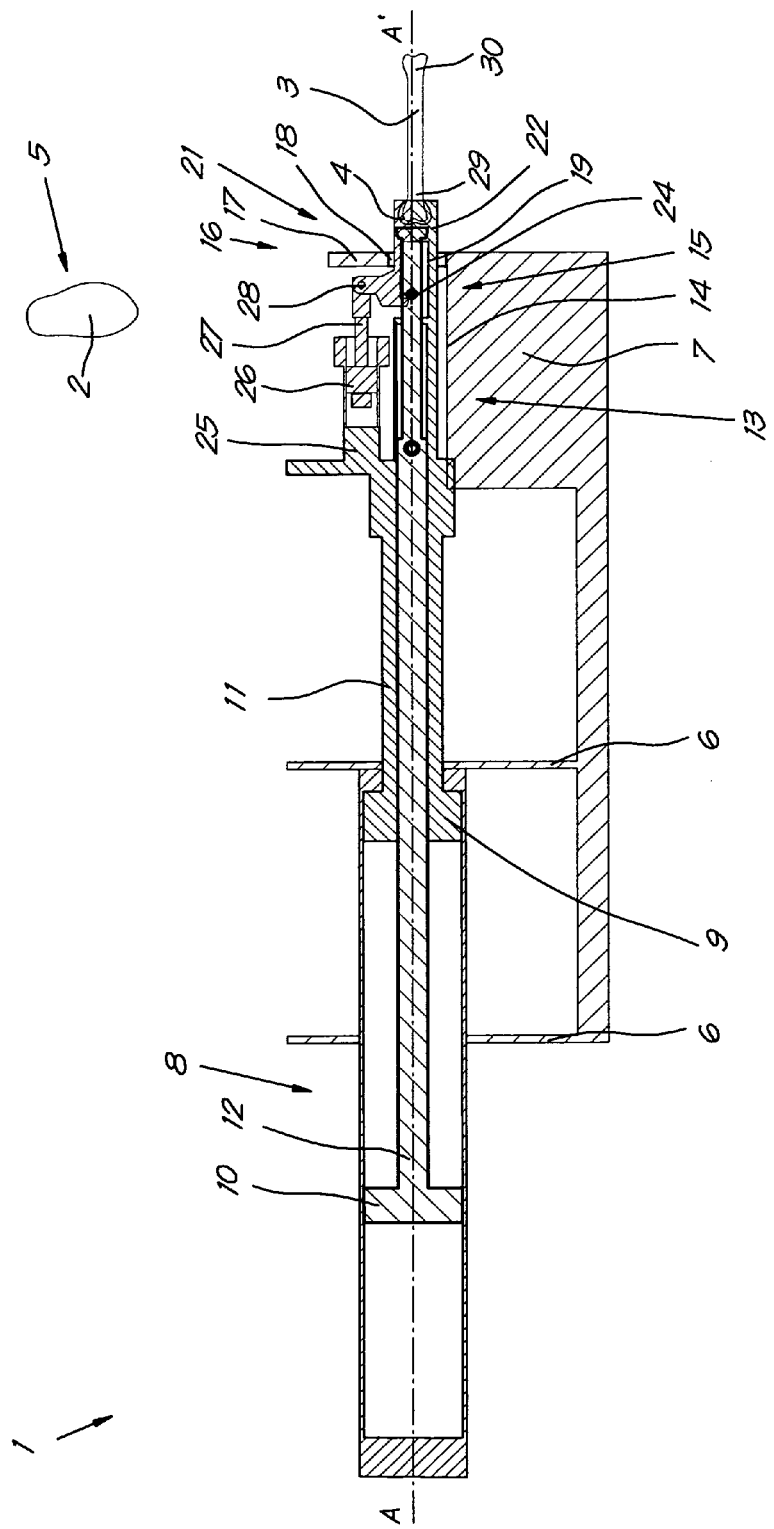

The same actuating means also allow for an axial movement of the inner rod 12 with respect to the outer rod 11 and the encapsulating means 20, between, on the one hand, an extended axial position in which the inner rod 12 extends through the encapsulating means 20 for releasing the bone 3 and cartilage 4, which extended axial position is represented in FIG. 5, and, on the other hand, a retracted axial position in which the inner rod 12 is not extending through the encapsulating means 20, which retracted axial position of the inner rod 12 is for example represented in FIGS. 3 and 4.

A device 1 as above described is very suitable for removing a bone 3 and cartilage 4 from a part 5 of a slaughtered animal, in particular from a fowl thigh, in a fully automated way, by applying a method in accordance with the present invention, as will be explained hereafter by referring to the FIGS. 2 to 5.

As is represented in FIG. 2, first a part 5 of a slaughtered animal, which is in this case a poultry thigh 5 has to be placed on the platform of the holding means 7.

It is important to align the bone 3 of the thigh 5 with the axial groove 14 in the holding means 7 and to direct the axial end 29 of the thigh 5 on which the cartilage 4 is present towards the bone pusher, formed by the piston rods 11 and 12.

In a first essential step of the method according to the invention said axial end 29 of the bone 3 together with the cartilage 4 at that axial end 29 is encapsulated into an encapsulating means 20 prior to the actual separation of the meat part 2 from the bone 3 and cartilage 4.

For that purpose the actuating means of the finger 23 are first actuated in such a way that the piston 26 and piston rod 27 are in an axially retracted position in the cylindrical tube 25 in order to bring the finger 23 in a radial outward position by rotation of the finger 23 around the hinge 24.

This radial outward position of the finger 23 corresponds to a radial open position of the encapsulating means 20 and is represented in FIG. 2. The radial opening at the axial end 21 of the bone pusher 11, 12 must be wide enough in order to be able to embrace the axial end 29 of the bone 3 with cartilage 4.

Furthermore, the inner rod 12 is actuated in the above described retracted axial position with respect to the outer rod 11 in which the inner rod 12 is not extending through the encapsulating means 20.

Then, according to a preferred method in accordance with the invention, prior to the closing of the encapsulating means 20, the encapsulating means 20 are moved in an axial direction AA' towards the axial end 29 of the bone 3 in order to embrace the bone end 29 and the concerned cartilage 4, after which the encapsulating means 20 are brought into a radially closed position by a rotation of the finger 23 around the hinge 24 into a radial inward position in order to encapsulate the axial end 29 of the bone 3 with cartilage 4.

As an alternative the first axial end 29 of the bone 3 and the cartilage 4 at that end 29 can firstly be encapsulated in the encapsulating means 20 by bringing them into the encapsulating means 20, for example by hand, after which the encapsulating means 20 can be immediately brought into a radially closed position before the part 5 is moved towards the aperture 19 in the meat stripper 16.

The dimensions of the pair of half cylindrical walls 22 and 23 are such that in the radially closed position of the encapsulating means 20, the axial end 29 of the bone 3 and the cartilage 4 at that axial end 29 are firmly fitted in between the half cylindrical walls 22 and 23, so that the axial end 29 of the bone 3 and the cartilage 4 at that axial end 29 can not easily escape from their enclosure in the half cylindrical walls 22 and 23.

During the next essential step of a method according to the invention the meat part 2 is separated from the bone 3 and said cartilage 4, a second axial end 30 of the bone 3 being pushed through the aperture 19 in the meat stripper 16.

As explained in the introduction the thigh 5 is cut from the slaughtered animal in such a way that at said second axial end 30 of the bone 3 there is no or almost no cartilage.

This step of the method is illustrated in FIG. 3.

The pushing action is realized by the actuating means which drive the piston rods 11 and 12 in the cylindrical tube 6.

Hereby, the inner rod 12 is kept in its retracted axial position with respect to the outer rod 11, while the axial end 29 of the bone 3 and cartilage 4 at that end are kept encapsulated in the encapsulating means 20.

In that way contamination of the meat part 2 with cartilage 4 is avoided so that a pure meat part 2 is obtained.

The separation of the meat part 2 from the bone 3 and cartilage 4 is terminated by pushing the encapsulating means 20 through the aperture 19 in the meat stripper 16.

As is represented in FIG. 4, the meat part 2 is remaining at the side of the meat stripper 16 which is directed to the holding means 7.

In the last essential step of a method according to the invention the axial end 29 of the bone 3 with cartilage 4 are released from the encapsulating means 20.

In the embodiment of the figures, this is realized by pushing the encapsulated axial end 29 of the bone 3 and the concerned cartilage 4 out of the encapsulating means 20, while the encapsulating means 20 are still in a radially closed position.

As is represented in FIG. 5, this pushing action is obtained by a movement of the inner piston rod 12 with respect to the outer piston rod 11, from a retracted axial position to an extended axial position.

As a result the bone 3 with cartilage 4 remain at the other side of the meat stripper 16 and can for example be collected at that side in a garbage box or the like for possible further processing.

Finally, in a last step, the encapsulating means 20 is pulled again backwards through the aperture 19 in the meat stripper 16 into its original position, which is represented in FIG. 2, for receiving the next part 5 of a slaughtered animal.

It is possible to provide additional means, such as mechanized cutting means, in order to make sure that during this step of the method all connections between the pure meat 2 and the bone 3 with cartilage 4 are broken or cut, so that no cartilage 4 or bone 3 can return back through the meat stripper 16 when the encapsulating means 20 are pulled backwards.

It is clear that a method and device 1 for applying the method according to the invention, is resulting in an easy and very effective separation of the meat part 2 of a bone 3 and cartilage 4 of a part 5 of a slaughtered animal, the meat part 2 being not contaminated with cartilage 4 and no manual intervention being required for separating cartilage 4 from the meat part 2.

During tests it has even been ascertained that the separation obtained with the above described method is almost perfect, apart from a very small amount of meat fragments which remain stuck in some cases to the bone during separation, but even in this case even a better efficiency is obtained than with the known methods.

The embodiment of a device 1 according to the invention described by means of the FIGS. 1 to 5 is just one of the possibilities and other embodiments are of course not excluded according to the invention.

For example, the encapsulating means 20 could have a completely different shape, by having for example multiple fingers 23 or by having for example fingers which do not rotate around a hinge 24, but which move in a radial outward and inward direction while staying aligned along the axial direction AA'.

Also other methods for separating the meat part 2 from the bone 3 and cartilage 4 are not excluded from the invention.

For example, instead of using a meat stripper 16, the meat part 2 could be removed by means of a cutting tool or by means of an additional gripping means which grabs the meat part 2 from the bone 3 and cartilage 4, while the axial bone end 29 and cartilage 4 at that axial end 29 are still encapsulated in the encapsulating means 20 during the separation in order to avoid contamination of the meat part 2 with cartilage 4.

The present invention is in no way limited to the embodiments described above and represented in the drawings, but such a method and device 1 for applying the method may be realised in different shapes and dimensions, as well as a method according to the invention may be used which is different from the above-described, without departure from the scope of the invention.

The invention claimed is:

1. Device (1) for separating a meat part (2) from a bone (3) and cartilage (4) of a part (5) of a slaughtered animal, wherein it comprises an encapsulating means (20) for encapsulating a first axial end (29) of the bone (3) and the cartilage (4) at that axial end (29), wherein the encapsulating means (20) are provided at an axial end (29) of a bone pusher (11,12), wherein the encapsulating means (20) comprise at least one finger (23) which is movable between a radially open position and a radially closed position with respect to the axis (AA') of the bone pusher (11,12), and wherein the finger (23) is at one end fixed rotatably with respect to the bone pusher (11,12).

2. Device (1) according to claim 1, wherein it is provided with actuating means for a bidirectional axial movement of the bone pusher (11,12) in a cylindrical tube (8).

3. Device (1) according to claim 1, wherein it is provided with a meat stripper (16) which comprises a membrane (18) having a central aperture (19), the bone pusher (11,12) being aligned with said aperture (19) and being provided with actuating means for a movement of the bone pusher (11,12) in the axial direction (AA') between an axial backward position for receiving parts (5) of a slaughtered animal between the bone pusher (11,12) and the meat stripper (16) and a forward position in which the encapsulating means (20) are pushed through the meat stripper (16).

4. Device (1) according to claim 3, wherein it is provided with additional means for breaking or cutting all connections between the pure meat (2) and the bone (3) with cartilage (4), after the encapsulating means (20) have been pushed through the meat stripper (16), which are such that no cartilage (4) or bone (3) can return back through the meat stripper (16) when the encapsulating means (20) are pulled backwards.

5. Device (1) according to claim 3, wherein the encapsulating means (20) are provided on an outer piston rod (11) of the bone pusher in which an inner piston rod (12) is provided, the inner piston rod (12) being provided with actuating means for an axial movement of the inner piston rod (12) with respect to the outer piston rod (11) and the encapsulating means (20), between an extended axial position in which the inner piston rod (12) extends through the encapsulating means (20) for releasing the bone (3) and cartilage (4) and a retracted axial position in which the inner piston rod (12) is not extending through the encapsulating means (20).

6. Device (1) for separating a meat part (2) from a bone (3) and cartilage (4) of a part (5) of a slaughtered animal, wherein it comprises an encapsulating means (20) for encapsulating a first axial end (29) of the bone (3) and the cartilage (4) at that axial end (29), wherein the encapsulating means (20) are provided at an axial end (29) of a bone pusher (11,12), wherein the encapsulating means (20) comprise at least one finger (23) which is movable between a radially open position and a radially closed position with respect to the axis (AA') of the bone pusher (11,12), and wherein the finger (23) is provided with actuating means for moving the finger (23) between a radial outward position corresponding to said radially open position and a radial inward position corresponding to said radially closed position and holding it in the respective positions.

7. Device (1) according to claim 6, wherein the finger (23) is at one end fixed rotatably with respect to the bone pusher (11,12).

8. Device (1) according to claim 6, wherein it is provided with a meat stripper (16) which comprises a membrane (18) having a central aperture (19), the bone pusher (11,12) being aligned with said aperture (19) and being provided with actuating means for a movement of the bone pusher (11,12) in the axial direction (AA') between an axial backward position for receiving parts (5) of a slaughtered animal between the bone pusher (11,12) and the meat stripper (16) and a forward position in which the encapsulating means (20) are pushed through the meat stripper (16).

9. Device (1) according to claim 8, wherein it is provided with additional means for breaking or cutting all connections between the pure meat (2) and the bone (3) with cartilage (4), after the encapsulating means (20) have been pushed through the meat stripper (16), which are such that no cartilage (4) or bone (3) can return back through the meat stripper (16) when the encapsulating means (20) are pulled backwards.

10. Device (1) according to claim 8, wherein the encapsulating means (20) are provided on an outer piston rod (11) of the bone pusher in which an inner piston rod (12) is provided, the inner piston rod (12) being provided with actuating means for an axial movement of the inner piston rod (12) with respect to the outer piston rod (11) and the encapsulating means (20), between an extended axial position in which the inner piston rod (12) extends through the encapsulating means (20) for releasing the bone (3) and cartilage (4) and a retracted axial position in which the inner piston rod (12) is not extending through the encapsulating means (20).

\* \* \* \* \*